Nov. 29, 1966  R. E. GAYLORD  3,289,203
AUTOMATIC CONTROL SYSTEM FOR AIRCRAFT
Filed May 1, 1953  4 Sheets-Sheet 1

INVENTOR
RUSSELL E. GAYLORD

BY
ATTORNEYS

Nov. 29, 1966  R. E. GAYLORD  3,289,203
AUTOMATIC CONTROL SYSTEM FOR AIRCRAFT
Filed May 1, 1953  4 Sheets-Sheet 4

INVENTOR
RUSSELL E. GAYLORD
BY
ATTORNEYS

United States Patent Office 3,289,203
Patented Nov. 29, 1966

3,289,203
AUTOMATIC CONTROL SYSTEM FOR AIRCRAFT
Russell E. Gaylord, % Naval Research Laboratory,
Anacostia Station, Washington, D.C.
Filed May 1, 1953, Ser. No. 352,601
14 Claims. (Cl. 343—6)

The invention described herein may be manufactured and used by or for the Government for governmental purposes without the payment of any royalty thereon.

This invention relates in general to a system for establishing a radio controlled traffic pattern for aircraft, and more particularly to a novel system for controlling the landing operations of air traffic approaching a base point.

In supervising the landing operations of aircraft entering large, congested airports, or in directing the landing operation of carrier based aircraft, it is highly desirable that the incoming aircraft be under the direct surveillance and supervision of a traffic control officer. To establish such a relationship between the incoming aircraft and the traffic control officer, it is of course fundamental that an orderly, preselected traffic pattern be established and obeyed.

It is accordingly an object of this invention to provide a radio controlled traffic pattern for aircraft approaching a given base point.

It is another object of this invention to provide a system for automatically holding air traffic approaching a given base point in a predetermined pattern and to release such aircraft for landing purposes one at a time as desired.

It is another object of this invention to provide a traffic control pattern which may be entered by incoming aircraft from any angle.

It is another object of this invention to provide an air traffic control system in which the incoming aircraft are under the direct control and supervision of a traffic control center.

Other objects and features of the present invention will become apparent upon a careful consideration of the following description when taken in connection with the accompanying drawings, in which:

FIGURE 3a is a more detailed block diagram of the pulse separator and error generator circuits incorporated in the airborne equipment.

FIGURE 3b shows a series of waveforms useful in explaining the operation of FIGURE 3a.

FIGURE 4 is a schematic diagram showing in more detail the error generating circuits of FIGURE 3a.

Figure 1:
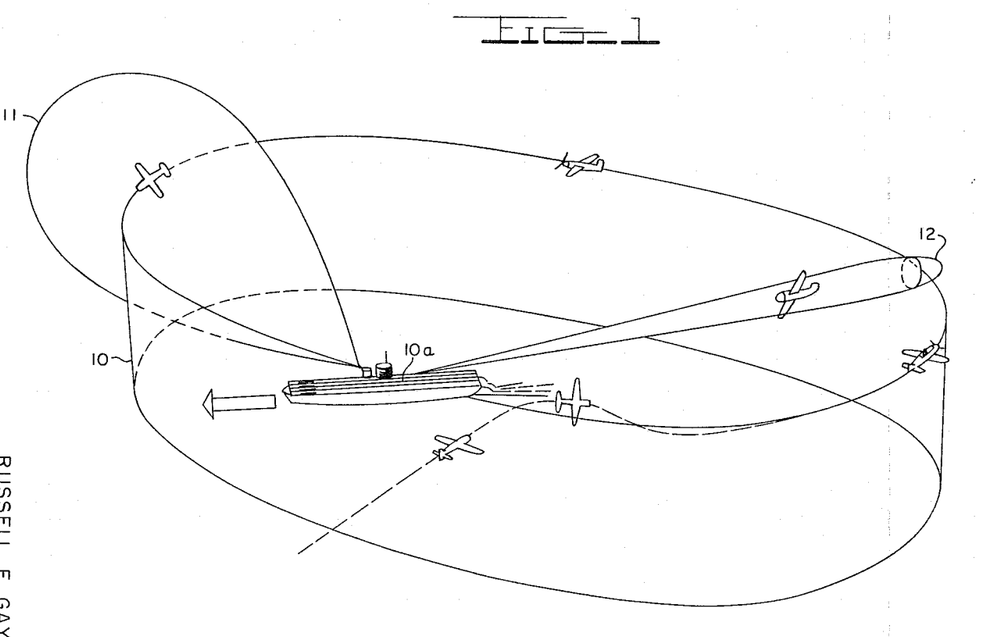
FIGURE 1 is a diagrammatic representation of the traffic control pattern provided by the present invention.

As diagrammatically illustrated in FIGURE 1 and in accordance with the underlying principles of the present invention, a suitable radio controlled air traffic pattern 10 is established adjacent the landing area by emitting therefrom a modulated radio signal the modulation characteristics of which when received at the aircraft indicate at the aircraft the desired range for that particular bearing. This pattern is constituted so as to define a closed path in which the incoming aircraft are to fly preparatory to the execution of the final phase of the actual landing operation of the aircraft, and may be of any size and shape compatible with the maneuverability of the incoming aircraft. For instance it may be an ellipse which encircles the landing area 10a as shown in FIGURE 1, and in a typical case the minor and major axis of the ellipse would equal 3500 and 4600 yards respectively. In the preferred embodiment of the present invention a radar system having a directional energy emission which is rotated in the horizontal plane at a relatively high velocity is utilized at the landing area to generate the flight pattern 10. This beam, shown at 11 in FIGURE 1, is preferably very narrow in azimuth, 3 to 5°, and is fanned, 15 to 20° in elevation. The instantaneous range of the pattern 10 relative to the landing area is established by emitting from the ground based radar system two, preferably distinguishable pulses; a main pulse followed in time by an auxiliary pulse, the delay interval between the two defining the range of the traffic control pattern. In the selected case where the pattern is an ellipse the time interval between the pulse pair emitted by the radar is, of course, varied synchronously with rotation of the beam 11 so that the instantaneous time interval between the pulse pair continuously indicates the desired range of the flight path at all bearings relative to the landing area.

A suitably equipped aircraft entering the field of the radar from any bearing, receives the two aforesaid pulses the time spacing of which is indicative of the desired range for the bearing of the aircraft. Then by determining at the aircraft, the aircraft's bearing and actual range relative to the landing area the actual range can be compared with the desired range and the pilot can either manually fly or set the aircraft's auto-pilot to fly a path which makes the aircraft's range and the traffic control pattern range one and the same. At this point a hard right turn is executed and the aircraft flies about the landing area in a counter-clockwise manner and in the range band set by the traffic control pattern until such time as a command is released from the ground based equipment for the aircraft to initiate a landing operation.

In the preferred embodiment, the aircraft's actual range is determined at the aircraft by the use of a beacon system which, upon receipt of the main radar pulse, transmits a radar reply signal which is received at the land based radar and retransmitted immediately to the aircraft as a beacon reply signal. Thus, the time interval between the receipt of the main pulse, and the beacon reply pulse indicates the actual range of the aircraft. The aircraft's relative bearing may easily be indicated through the use of direction finding equipment or other suitable bearing determining equipment contained on the aircraft. The pilot, now having information concerning his bearing, actual range and desired range can set the automatic pilot equipment of the aircraft to fly a course which causes the aircraft to intercept the traffic control pattern at any suitable preset altitude. Upon interception of the traffic control pattern, the automatic equipment carried by the aircraft and provided by the present invention initiates a hard right turn by the aircraft causing the same to proceed in a counter-clockwise manner about the traffic control pattern and thus about the landing area at a range defined by the traffic control pattern and at an altitude previously defined and set by the pilot at the time of engagement of the system. This flight pattern is maintained until such time as the traffic control officer sees fit to release the aircraft from the pattern and start the same on its downward descent to the landing point.

The release and downward descent can be made automatic, if desired, as later described. In this case it is desired that the final approach phase of the landing aircraft become part of the system. For this purpose any one of a number of beam riding or other suitable guidance systems such as that shown in U.S. Patent 2,599,223 to D. Blitz can be incorporated in the system. The beam riding transmitter in a typical instance is located near the terminal end of the runway and directs a highly directional radio beam 12 upwards to intercept the traffic control pattern 10 at a point in line with the runway. As the aircraft proceeds around the traffic control pattern, the point of interception of the landing beam 12 and the traffic control pattern 10 is reached, and if the traffic control officer finds it convenient to initiate a landing operation the landing beam may be turned on or an enabling modulation may be placed on the landing beam 12 which, when detected by the airborne beam riding receiver, transfers control of the aircraft from the traffic control pattern 10 to the landing beam 12. A beam rider flight is then made down the beam 12 until visual contact with the landing area is made.

As will be gleaned from an inspection of FIGURE 1, the obvious advantage resulting from the use of an elliptical traffic pattern is that the axis of the runway can conveniently be arranged as illustrated to make a small angle with the major axis of the ellipse so that as the aircraft executes the turn at the minor end of the ellipse near the guidance beam 12 its flight path is nearly in line with the approach path to the landing strip. Consequently, when the command to land is released, the aircraft has at that instant an attitude which is best suited to the execution of a smooth approach to the landing strip.

Figure 2A:
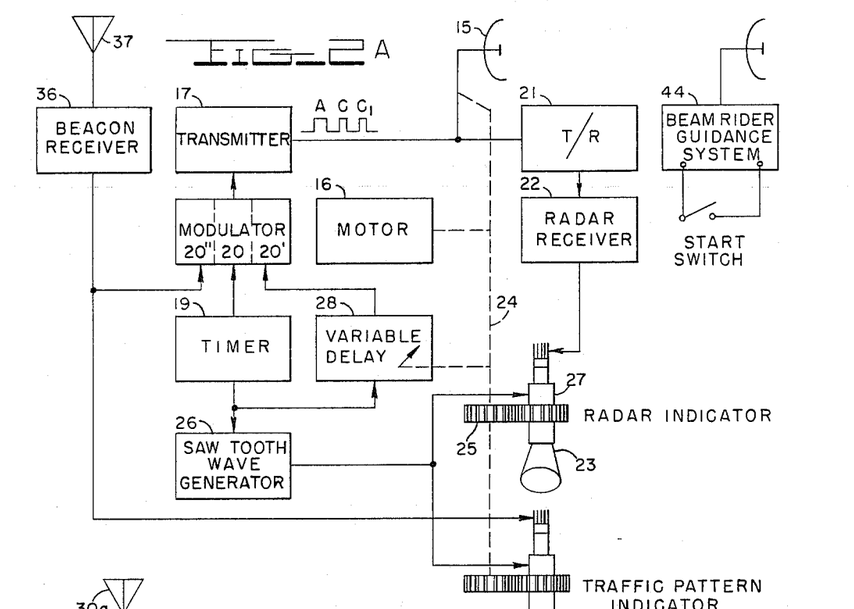
FIGURES 2a and 2b show simplified block diagrams of the ground based and airborne equipment, respectively.
Figure 2B:
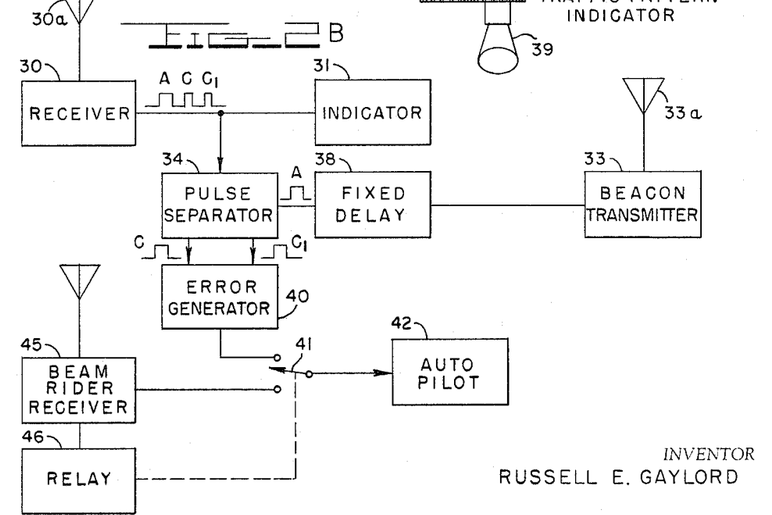

Preferred embodiments illustrating in block form the ground based and airborne equipment are shown in FIGURES 2a and 2b, respectively, to which reference is now made. As illustrated in FIGURE 2a the ground based equipment is provided with a pair of cathode ray tube indicators 23 and 39 the first of which, 23, provides a conventional plan position type indication of all objects in the immediate area including the incoming aircraft, whereas the second, 39, provides only an indication of the properly equipped aircraft in, entering, and approaching the traffic pattern. As herein illustrated the elliptical traffic control pattern is generated by directional antenna 15 which is rotated 360° in azimuth at a high speed by motor 16. In a typical example the rotational rate of antenna 15 is 60 revolutions per minute. Coupled to the antenna 15 is a suitable pulse transmitter 17 designed to emit main radar pulses at a rate, for example, of 1,000 pulses per second. This pulsing rate is established by a timer 19 which may be any free running source coupled to key a suitable pulse modulator 20 which in turn pulse modulates the transmitter 17 with a pulse A of the desired shape as described more fully hereinafter. To obtain a radar display of all the objects in the immediate vicinity of the landing area, the PPI indicator 23 is coupled to the antenna 15 through a conventional radar receiver 22 and transmit-receive device 21. The deflection yoke 27 of the PPI indicator 23 is energized from a suitable saw-tooth wave generator 26 which in turn is operated synchronously with transmitter 17 by a connection to timer 19. The saw-tooth generator 26 produces a radial range sweep on indicator 23 with the position of the sweep being controlled by the angular position of the yoke 27 which in turn is rotated in synchronism with the rotation of antenna 15 by means of gear mechanism 25. With this arrangement the initiation of the radial sweep on indicator 23 is synchronized with the emission of a pulse from transmitter 17 and the angular orientation of the radial sweep is made to correspond to the orientation of the antenna 15 by synchronous rotation of the yoke 27 through gear train 25. Immediately following the transmission of main radar pulse A from transmitter 17 the transmit-receive switch 21 couples the radar receiver 22 to antenna 15 and the energy reflections received from the transmitted pulse are then applied to the intensity grid of indicator 23. Indicator 23 will thus indicate not only the position of the aircraft entering the system but also all other energy reflective objects within the range of the radar system.

In the preferred embodiment of the present invention, as above mentioned, the range of the air traffic control pattern 10 is established by the emission of a pair of variably timed spaced pulses. The first of these pulses can be the main radar pulse inaugurated by timer 19 and indicated at A in the oscillogram accompanying FIGURE 2a. The second pulse, or auxiliary pulse indicated at C in the oscillogram, can conveniently be obtained by incorporating in the system a variable delay circuit 28 the pulse input to which may be provided by timer 19 with the pulse output from delay 28 used to drive a second modulator 20' which in turn keys transmitter 17 at a time delay following the main transmitter pulse A as determined by the instantaneous setting of delay circuit 28. Delay circuit 28 can be any conventional delay device known to the art, such as a tapped delay line or alternatively a delay multivibrator, the delay of which is varied synchronously with the rotation of antenna 15. For example, a suitable cam linkage or the like connected between the delay control element of circuit 28 and the rotational shaft 24 associated with antenna 15 can be employed as indicated by the dotted line.

Referring now to FIGURE 2b, pulses A and C are received at the aircraft on any suitable antenna 30a such as an omnidirectional antenna and applied to a receiver 30 where they are amplified and detected and fed to an indicator 31 which measures and indicates the time interval between the pulses. Indicator 31 may be any conventional time indicating device such as a "Loran" type cathode ray tube timing indicator. The time spacing of the received A and C pulses detected by receiver 30 and indicated on indicator 31 provides the pilot with information concerning the desired range for the bearing of the aircraft relative to the landing area. To establish the actual range of the aircraft, the aircraft equipment includes a beacon transmitter 33 arranged to transmit a reply pulse in response to and at a fixed time interval after receipt of the main radar pulse A. This action can be effected by separating the main pulse A from the delay pulse C in a suitable pulse separating circuit 34, later to be described, and applying the main pulse A to the beacon transmitter 33 to inaugurate a response thereby. To effect the separation by separator 34 the main pulse A is endowed with a different pulse characteristic than the delay pulse C. In a typical case pulse A is made wider than pulse C by the action of modulators 20 and 20' at the ground based equipment. The beacon pulse which is emitted from transmitter 33 and associated antenna 33a, preferably on a separate carrier from the radar carrier, is received back at the ground station by any suitable antenna 37 and applied to a beacon receiver 36. This pulse may be indicated on the traffic pattern indicator 39 by applying the output of the beacon receiver to the intensity control grid of the indicator. This indicator like indicator 23 may be provided with a plan position type of indication, the radial trace of which is synchronized both in initiation and in angular position with that of the radar indicator 23. This type of indication can be obtained simply by energizing the deflection yoke of indicator 39 from saw-tooth generator 26 and by rotating the yoke from the antenna shaft 24 all as indicated in the drawings. Since beacon receiver 36 is tuned to receive only those pulses returned by the beacon transmitter 33 which operates on a different carrier than the radar transmitter 17, indicator 39 will provide the traffic control officer with an indication of the progress and disposition of all properly equipped incoming aircraft to the exclusion of all other energy reflective objects.

The received beacon pulse after amplification in receiver 36 is also applied to a separate modulator 20'' to again key transmitter 17 to produce pulse $C_1$ which is delayed from the main radar pulse A by a time interval which is a function of the actual range of the aircraft. This latter pulse $C_1$ is received back at the airborne equipment and an indication thereof given on indicator 31. By monitoring the time relationship of the received pulses C and $C_1$ the pilot may be kept informed of his range relative to the desired range established by the traffic control pattern.

From the foregoing discussion it will be recognized that the transmitted beacon reply pulse $C_1$ is delayed from the transmitted pulse A by the time interval required for the A pulse to travel to the aircraft, be repeated by the beacon receiver-transmitter equipment thereof and to return to the ground based transmitter. In other words, the $C_1$ pulse is delayed from the A pulse by effectively the two way travel time occasioned by the aircraft distance from the ground based station. At the same time the C pulse may be arbitrarily delayed from the main pulse A by an amount which stimulates the two way pulse travel time due to the distance of the aircraft from the ground based station. Thus at the ground station the time spacing of the artificially delayed pulse C and the beacon responser pulse $C_1$ diminishes as the aircraft approaches the desired range and finally when the aircraft's actual range and desired range close to zero the C and $C_1$ pulses tend to coincide in time. At the aircraft the A, C and $C_1$ pulses are all, of course, received in accordance with their order of transmission. Thus the time difference in receipt of the C and $C_1$ pulses will be an indication of the error between the aircraft's actual range and its desired range.

Since the time difference of receipt of the C and $C_1$ pulses at the aircraft provide an indication of the error between the aircraft's range and the range of the traffic control pattern, this time difference may be employed in suitable electrical circuits to generate an error signal which is proportional to the time difference in arrival of the C and $C_1$ pulses. The error signal thus generated may in turn be used to automatically control the flight path of the aircraft once the same has intercepted the air traffic control pattern and to hold the plane in this pattern.

It is obvious that if no retransmission delays were present in the beacon system the C and $C_1$ pulses would arrive synchronously at the aircraft at the instant the aircraft intercepted the traffic control pattern. Since synchronous pulses, however, are not only difficult to distinguish but would in fact appear at the aircraft receiver 30 as a single inseparable pulse, it has been found desirable to maintain a minimum fixed delay between the times of arrival of the C and $C_1$ pulses. This delay is achieved by delaying the response of the beacon transmitter 33 to the A pulse by inserting the fixed delay circuit 38 between the output of the pulse separator 34 and the beacon transmitter 33. With this arrangement the $C_1$ pulse arrives at the aircraft at a fixed time interval after the C pulse at the moment the aircraft intercepts the air traffic control pattern. The C and $C_1$ pulses thus being separated in time are readily distinguishable and may therefore be simply and conveniently handled in generating an error signal.

In handling the received pulses C and $C_1$ at the airborne receiver, pulse separating circuit 34 separates the two pulses in two paths and their time difference in arrival is compared in an error generator 40. The output of the error generator 40 is in the form of a D.C. voltage which, as later described in detail, varies in magnitude and in sign according to the variation in the actual range of the aircraft relative to the range defined by the traffic control pattern. This signal is fed by way of switch 41 to suitable automatic control equipment 42 which operates in any convenient manner known to the art to hold the aircraft in the desired traffic control pattern once the same has been intercepted. For example, the error signal can be introduced into the auto-pilot system in the same manner as the maneuvering or trim signal is introduced in the airplane control system shown in U.S. Patent 2,582,305 of C. M. Young.

As previously indicated the function of the error generator 40 and automatic control 42 is such that once the aircraft enters the traffic control pattern a hard right turn is initiated and the aircraft flies in a counter-clockwise direction around the traffic control pattern until the traffic control officer sees fit to initiate a landing operation by actuation of the beam rider guidance system shown in FIGURE 2a as block 44. This system may be similar to that shown in the Blitz patent mentioned above. As the aircraft reaches the point in the air traffic control pattern 10 intersected by the landing beam 12 the guidance system 44 may be turned on or alternatively an enabling modulation may be selectively placed on the beam rider 12 by actuation of the start switch by the traffic control operator. This action shifts the control signal input to the automatic pilot 42 from the traffic pattern 10 to the guidance beam 12. In more particular the beam guidance signal emitted on beam 12 is received by a beacon rider receiver 45 located on the aircraft and the output from receiver 45 is employed to actuate a relay 46 which in turn operates switch 41 to shift the control signal input to the automatic pilot control 42 from the traffic pattern receiver 30 to the beacon rider receiver 45. The final phase of the landing operation is then started and pursued in the usual beam rider manner.

Figures 3A, 3B:
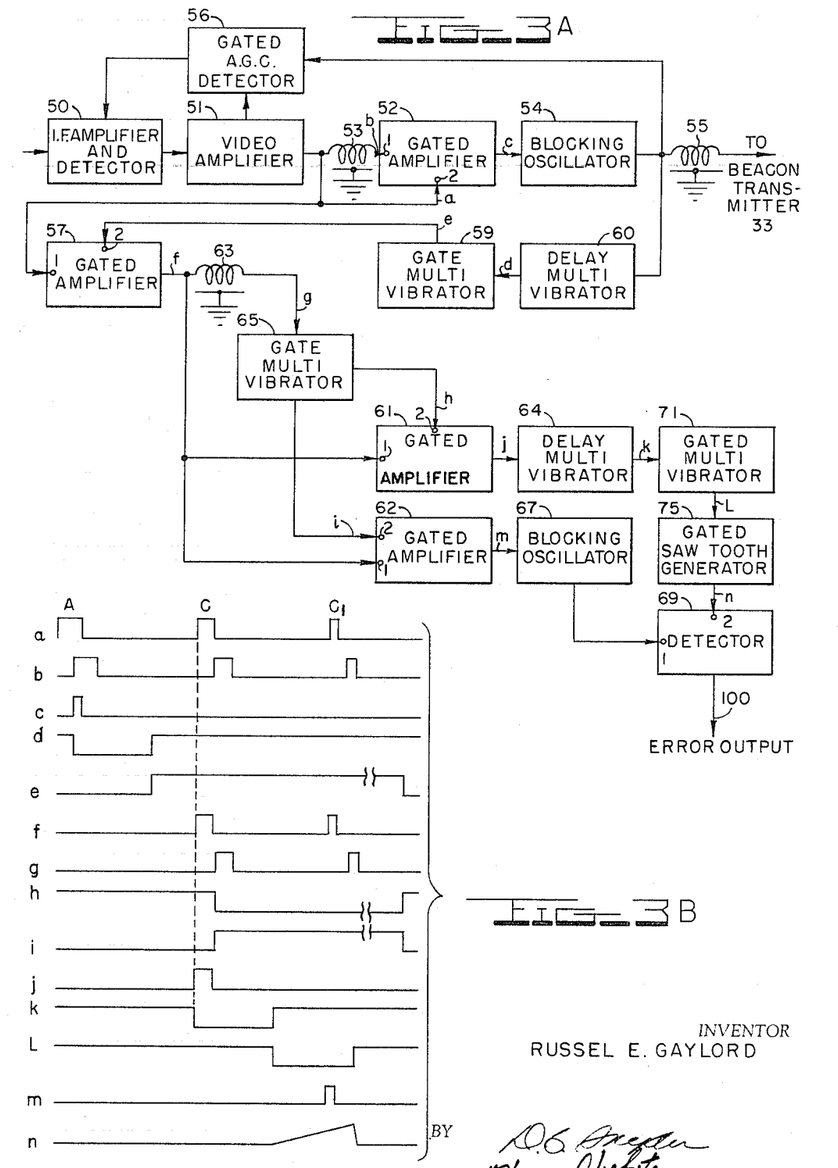

Turning now to FIGURES 3a and 3b the general make up and operation of the pulse separator 34 and error generator 40 located in the airborne equipment will not be described. As previously indicated one of the functions of the pulse separator is to produce a beacon response from beacon transmitter 33 upon receipt of the main radar pulse A. This action may be be accomplished by pulse width discrimination as illustrated in the diagram, by feeding the detected output of IF amplifier 50 of receiver 30 through a suitable video amplifier 51 to a gated amplifier 52. Gated amplifier 52 is preferably of the type which is normally non-responsive except upon the simultaneous occurrence of a pair of signal inputs to its respective input terminals 1 and 2. Input terminals 1 and 2 of gate amplifier 52 are in turn connected in parallel to the output of the video amplifier 51 with terminal 2 receiving a direct connection from the output of amplifier 51 and terminal 1 a connection to the output of amplifier 51 through a suitable delay line 53. Delay line 53 operates to provide a delay slightly shorter than the duration of the A pulse but greater than the duration of the received C and $C_1$ pulses. The respective signal inputs to terminals 2 and 1 of the gate amplifier 52 are shown more clearly in waveforms a and b of FIGURE 3b. As indicated in this figure it is only during the trailing edge of the received A pulse that coincidence in signal input to terminals 1 and 2 occurs. The output of gate amplifier 52 may thus be represented as shown in waveform c of FIGURE 3b. This output pulse (waveform c) operates a suitable pulse shaping network such as blocking oscillator 54 which in turn feeds its output through a suitable delay line 55 (corresponding to delay 38) to the beacon transmitter 33 to operate the latter.

Since the pulses received by the ariborne equipment occur in bursts, one burst for each revolution of the radar scanning antenna, the problem of automatic gain control of the airborne receiver is acute. To satisfy the automatic gain control problem a conventional keyed automatic gain control detector system such as that now found in modern day television receivers may be employed. To this end, the output of video amplifier 51 is applied to the gain control detector stage 56 which, as is common to keyed automatic gain control systems, generates a direct voltage output only in response to the video signal received during the occurrence of a gating pulse, in this case the pulse output from the blocking oscillator 54. Since the blocking oscillator pulse is generated in response to the A pulse, the automatic gain control voltage developed by stage 56 is a function only of the intensity of the A pulse.

Since the main pulse A and its timing relationship relative to the C and $C_1$ pulses is inconsequential to the generation of the error signal, the A pulse may be removed from the error channel. To effect this result the output of the video amplifier 51 is further applied to terminal 1 of a second gated amplifier 57. This amplifier, like amplifier 52, is normally inoperative except upon the simultaneous occurrence of a pair of input signals at terminals 1 and 2. The input to terminal 2 of this gated amplifier is derived from a normally inoperative gate multivibrator 59. Accordingly, amplifier 57 is normally inoperative upon receipt of the A pulse and this pulse is rejected from the output of the gated amplifier 57. Following the A pulse and before the C and $C_1$ pulses, however, multivibrator 59 is keyed to produce a gate voltage such as shown in waveform $e$ of FIGURE 3$b$. This gate voltage as shown, is delayed in time from the receipt of the A pulse but is started before the C and $C_1$ pulses. To obtain the delayed operation of multivibrator 59 a delay multivibrator 60 is connected to key multivibrator 59 from the output of the blocking oscillator 54. Delay multivibrator 60 receives the output from the blocking oscillator 54 and generates in response thereto a suitable delay pulse such as shown in waveform $d$ of FIGURE 3$b$ the trailing edge of which keys multivibrator 59. The output of gated amplifier 57 thus consists only of the C and $C_1$ pulses as shown in waveform $f$ of FIGURE 3$b$. This output signal is in turn applied in parallel to third and fourth gated amplifiers 61 and 62. The former is of the type which is normally operative except upon the impression on terminal 2 thereof of a negative gating signal, while the latter 62 is of the type that is normally inoperative and only rendered operative upon the simultaneous occurence of pulses to its input terminals 1 and 2. Since gated amplifier 61 is normally operative the C pulse shown in waveform $f$ is passed by amplifier 61 but is rejected by gated amplifier 62. To control the action of the gated amplifiers 61 and 62 the output of gated amplifier 57 is applied through a suitable delay line 63 to a gate multivibrator 65 which applies its negative output to gated amplifier 61 and its positive output to the normally inoperative gate amplifier 62. Delay line 63 provides a delay slightly in excess of the duration of the C pulse so that the input to gate multivibrator 65 may be illustrated by waveform $g$ of FIGURE 3$b$. Upon receipt of the delayed input pulse C, multivibrator 65 initiates a positive gate at terminal 2 of gate amplifier 62 as shown in waveform $i$ and a negative gate as shown by wavefore $h$ at terminal 2 of gate amplifier 61. The positive gate applied to gate amplifier 62 thus opens this gate permitting passage of the $C_1$ pulse while the negative gate impressed upon terminal 2 of gate amplifier 61 closes this gate immediately following the passage therethrough of the C pulse. The outputs from gated amplifiers 61 and 62 are shown in wave forms $j$ and $m$ respectively of FIGURE 3$b$.

The C and $C_1$ pulses having been separated by gated amplifiers 61 and 62 are now in a condition to be compared for times of receipt for the purpose of generating an error signal. To this end the $C_1$ pulse output from gated amplifier 62 is shaped in a suitable blocking oscillator 67 and applied to one input terminal of gated detector circuit 69. This circuit produces at output terminal 100 a direct current error voltage the magnitude of which is dependent upon the amplitude of a secondary signal applied to the amplitude control terminal 2 thereof. The amplitude control voltage for detector 69 is in turn derived from a saw-tooth voltage generator 75 the output of which is generated in response to the C pulse. For this purpose the C pulse passed by gate amplifier 61 is applied to a delay multivibrator 64 which generates a small delay pulse as shown in wave form $k$ and the output of this multivibrator is in turn employed to key a second multivibrator 71 which generates a gate of the desired duration as shown in waveform $l$. This gate is then employed to key the gated saw-tooth generator 75 which generates saw-tooth voltage pulse (waveform $n$) equal in duration to the gate applied thereto. The saw-tooth pulse is thus timed by multivibrator 64 to start at a fixed point (equal to the delay provided by line 55) after receipt of the C pulse and is timed by multivibrator 71 to persist for a short duration at a fixed time interval after the C pulse. The saw-tooth pulse shown by waveform $n$ is then applied to the gain control terminal 2 of detector 69 whereby the direct voltage output of detector 69 is made to vary in dependency upon the time of occurrence of the C′ pulse in the gate generated by multivibrator 71. More particularly, as the aircraft approaches the traffic control pattern and the $C_1$ pulse approaches the C pulse no error voltage is generated at the output 100 of detector 69 and the aircraft is not captured by the traffic pattern until a point is reached where the $C_1$ pulse occurs just within the gate generated by multivibrator 71 and therefore within the period of the saw-tooth generated by saw-tooth generator 75. Just at the point of entry of the aircraft into the desired range band the $C_1$ pulse occurs at the trailing edge of the saw-tooth voltage pulse from generator 75 and the output from detector 69 is a maximum direct voltage of one sign, representing a maximum error signal. As the aircraft continues its radial flight toward the ground station, this error signal diminishes in magnitude until a point is reached where the $C_1$ pulse occurs centered in time in the gate shown in waveform $l$ of FIGURE 3$b$. At this point the error signal reduces to zero and the desired range orbit has been reached. A deviation of the aircraft from this range shifts the position of the $C_1$ pulse relative to the C pulse and therefore its position relative to the center of the gate. In more particular, as the $C_1$ pulse varies from one side to the other of the center of the gate generated by multivibrator 71 the sign of the error voltage changes and the resulting output from detector 69 therefore can be used to operate the equipment for automatically controlling the flight path of the aircraft once the aircraft has assumed its position in the flight pattern.

As previously indicated, the preferred flight arrangement envisioned by the present invention is that the aircraft is to enter the flight pattern from the outside and is to execute a hard right turn upon engagement with the traffic control pattern and then fly in a counter-clockwise path around the pattern. Now then since from the above description it is apparent that the sign of the error voltage output from the detector 69 must be such that once the aircraft has been captured by the flight control pattern, a drift of the aircraft toward the outside of the traffic control pattern must cause a left hand turn, and further since the aircraft initially enters the pattern from the outside thereof, the error voltage generated at the output of detector 69 would have the wrong polarity to effect the right hand turn upon engagement of the pattern. Accordingly, the system of the present invention is arranged so that as the aircraft initially engages the flight pattern a fixed direct current voltage of predetermined magnitude and polarity is applied to the automatic pilot 42 until such time as the hard right turn has been executed and the aircraft starts to fly back out of the pattern. Then at this instant the fixed direct current voltage is automatically removed and the automatic pilot is connected to receive the error voltage output from detector 69. The apparatus for effecting this operation is shown in more detail in FIGURE 4.

Figure 4:
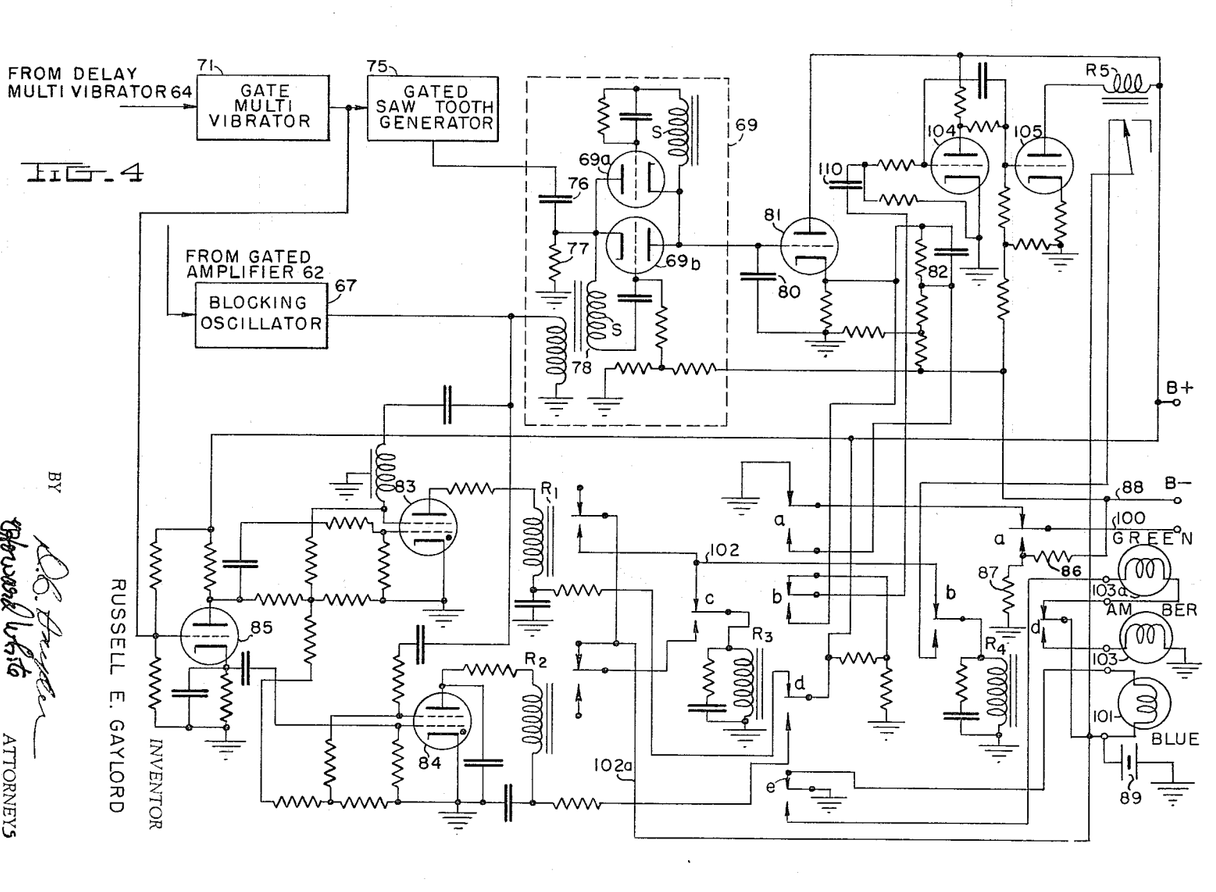

Before turning to FIGURE 4, it will be noted from the foregoing discussion that the duration of the gate generated by multivibrator 71 controls the effective inner and outer ranges in which an error signal is generated and therefore controls the effective inner and outer ranges of the traffic control pattern.

Referring now to FIGURE 4, the error detector 69 is shown enclosed with dotted lines and includes a pair of back to back connected triodes 69$a$ and 69$b$. The anode of triode 69$a$ is connected to the cathode of triode 69$b$ and both tube elements receive the gated saw-tooth output voltage from generator 75 through the coupling capacitor 76 and resistor 77. The grids of tubes 69$a$ and 69$b$ receive the $C_1$ produced gating pulse from blocking oscillator 67 through the secondaries S of coupling transformer 78. The anode of tube 69b and the cathode of tube 69a are connected to ground through a storage capacitor 80. In operation, coupling capacitor 76 removes the direct current component from the saw-tooth voltage applied thereto and the anode of tube 69a and cathode of tube 69b are driven alternately above and below ground by the saw-tooth voltage applied thereto. Tubes 69a and 69b are periodically rendered conductive at their grids by the application thereto of the blocking oscillator pulse produced by the $C_1$ pulse. Thus, the average charge on the storage condenser 80 remains zero until such time as the blocking oscillator pulse 67 is timed to occur in coincidence with the saw-tooth voltage produced by generator 75. As the aircraft approaches the desired range, the $C_1$ pulse closes in time on the saw-tooth voltage pulse until finally it coincides therewith. As the aircraft first comes into the flight control pattern the $C_1$ produced blocking oscillator pulse coincides with the saw-tooth pulse at the trailing edge thereof, and the charge accrued on storage condenser 80 is a maximum positive since the blocking oscillator pulse renders tube 69a conductive at the instant the saw-tooth voltage is a positive maximum. As the aircraft continues to close in range on the landing point the blocking oscillator pulse approaches the mid-point of the saw-tooth voltage where the charge or voltage developed on condenser 80 by the saw-tooth pulse is zero. This represents the desired range of the aircraft from the landing point and deviations in the aircraft's range from this desired range causes the $C_1$ produced blocking oscillator pulse to shift its position on the saw-tooth wave and this causes the voltage developed on storage condenser 80 to vary above and below zero. For example, if the aircraft should drift in closer to the landing point than desired, the $C_1$ produced blocking oscillator pulse approaches the start of the saw-tooth wave and the charge on condenser 80 approaches a maximum negative voltage since tube 69b will be rendered conductive at the instant the saw-tooth voltage wave is approaching a negative maximum. The voltage on condenser 80 represents the error voltage hereinabove referred to and it is applied as later described in more detail to the error voltage output terminal 100 through the upper contacts of contact set $a$ of relay $R_4$, lower contacts of contact set $a$ of relay $R_3$, equalizing network 82 and cathode follower 81.

As indicated hereinabove it is desired that the aircraft automatic pilot 42 be placed under the influence of a fixed D.-C. error voltage when the traffic pattern is first being engaged and then to transfer the control of the autopilot to the output of the error generator 69 after the aircraft has completed its right hand turn and has started back out of the flight control pattern. The circuits now to be described accomplish this function. As illustrated, the negative gate pulse from gate generator 71 which co-exists with the saw-tooth voltage produced by generator 75 and which in effect controls the effective radial thickness of the traffic control pattern is applied in push-pull to the first control grids of a pair of gas tubes 83 and 84 by way of a phase inverter 85. The second control grids of tubes 83 and 84 also receive the $C_1$ produced blocking oscillator pulse from blocking oscillator 67 in parallel as indicated. Tube 83 is connected to receive the positive gate output from inverter 85 and tube 84 is connected to receive the negative gate output from inverter 85. The connections to these tubes are such that tube 83 can only be rendered conducting during the simultaneous occurrence of voltage signals to its first and second control grids while tube 84 is connected so that this will be rendered conducting by the blocking oscillator 67 pulse only during the absence of an output from inverter 85. Accordingly as the aircraft enters the outer range radius of the control pattern and the $C_1$ pulse coincides with the gate multivibrator 71 pulse, gas tube 83 is fired and its plate relay $R_1$ is energized closing the armature on the lower contact. As will now be described momentary closure of relay $R_1$ energizes relays $R_3$ and $R_4$ causing their various armatures to close on the associated lower contacts, thereby connecting the error output terminal 100 to a fixed direct current turn voltage obtained from the junction point of resistor 86 and 87 connected between the negative bias lead 88 and ground. This output voltage is chosen to cause the hard right turn of the aircraft upon engagement with the traffic pattern.

The armature of relay $R_1$ is connected to the direct current relay and signal lamp source 89 and in the de-energized condition the armatures of the various relays $R_1$ through $R_4$ are in the position illustrated. Relay $R_5$ is normally energized and its position in this condition is as illustrated. In this condition the blue signal lamp 101 is lit by source 89, the circuit being completed through contact set $e$ of relay $R_3$. When the $C_1$ pulse arrives during the multivibrator 71 gate, tube 83 is fired and the armature of relay $R_1$ is closed onto its lower contact thereby energizing relays $R_3$ and $R_4$ from source 89 through leads 102a and 102. Energization of relay $R_3$ closes the armature of contact set $c$ down on the lower or holding contact where a holding current obtained from source 89 is applied through the upper contact of relay $R_2$ and lower contact of contact set $c$ of relay $R_3$. Likewise relay $R_4$ reecives a holding voltage from source 89 through the left hand contact of relay $R_5$ and lower contact of contact set $b$ of relay $R_4$. Energization of relay $R_3$ closes the armature of contact set $d$ onto its lower contact thereby removing the B+ connection of the plate of tube 83 to quench this tube and simultaneously applying B+ voltage to the plate of tube 84. Upon energization of relays $R_3$ and $R_4$ the blue signal lamp is extinguished by breaking the lamp circuit at contact set $e$ of relay $R_3$ and the amber signal lamp 103 is lit by closure of the armature of contact $d$ on the lower contact of relay $R_4$. Lighting amber signal lamp 103 signals the pilot that the traffic pattern has been engaged. At the same time the armature of contact set $b$ of relay $R_3$ closes on the associated lower contact thereby coupling the error output voltage from cathode follower 81 through condenser 110 to the input of a two stage 104, 105 integrating amplifier the output stage of which contains plate relay $R_5$. In the normal state, tube 105 is just conducting and the tube 104 is near cut off. The error voltage generated across condenser 80 is initially at a positive maximum when the control pattern is first engaged but is going negative due to the flight path of the aircraft at this instant. The connection of this negative going error voltage to amplifier 104 does not disturb the conducting condition of tubes 104 and 105. The error voltage output from cathode follower 81 continues to decrease and therefore relays $R_4$ and $R_5$ remains energized until the airplane has completed its turn and starts to fly out of the pattern. At this instant the error voltage starts to increase in a positive sense and this reversal in slope is coupled through condenser 110 to reverse the conduction conditions of amplifiers 104 and 105 thereby deenergizing relay $R_5$. Deenergization of relay $R_5$ breaks the holding circuit for relay $R_4$ permitting the armature of contact sets $a$, $b$ etc. of this relay to return to the position depicted. In this condition the error output terminal 100 is connected through the armature and upper contact of contact set $a$ of relay $R_4$ and the armature and lower contact of contact set $a$ of relay $R_3$ to the error output from cathode follower 81. At this time the armature of contact set $d$ of relay $R_4$ returns to the position shown thereby extinguishing the amber signal lamp 103 and at the same time lighting the green lamp 103a. This action indicates to the pilot that the aircraft has completed its turn and is now being controlled by the flight pattern signal as produced by the error generator 69. Under the control of the error voltage output from cathode follower 81 the aircraft continues to circle the base point following the flight control pattern at all times until the guidance system is actuated and the aircraft starts down the guidance beam. If in following the flight control pattern the aircraft should deviate from its desired range band and the $C_1$ pulse be received in nonsynchronous relation with the multivibrator 71 gate, tube 84 is rendered conducting closing relay $R_2$. Closure of relay $R_2$ breaks the holding circuit for relay $R_3$ which in turn removes the error voltage from the output terminal 100. At the same time the green signal lamp is extinguished and the blue signal lamp is lit indicating to the pilot that the plane is off course and back under manual control. The pilot must then fly a course which would permit recapture by the traffic control pattern.

Although I have shown and described only certain specific embodiment of the present invention, it must be understood that I am fully aware of the many modifications possible thereof. Therefore this invention is not to be limited except insofar as is necessitated by the spirit of disclosure given herein.

What is claimed is:

1. Apparatus for automatically guiding an aircraft about a base point, comprising at the base point, transmitting means adapted to provide a directional, azimuthally scanned radiant energy beam, means modulating said radiant energy beam to indicate a desired range to said base point, means operative to vary the modulation of said radiant energy beam with variations in bearing thereof; at said aircraft, means for receiving said directional energy beam, means to determine the actual range of said aircraft to the base point, means to generate a control signal dependent upon the range displacement of the aircraft from the desired range, and means responsive to said control signal for controlling the flight of said aircraft along a path where the aircraft's range and the desired range are one and the same.

2. Apparatus for automatically guiding an aircraft about base point, comprising at the base point, transmitting means adapted to provide a directional, azimuthally scanned, radiant energy beam, means modulating said radiant energy beam to indicate a desired range to said base point, means operative to vary the modulation of said radiant energy beam with variation in bearing thereof; at said aircraft, means for receiving said directional energy beam, and for deriving therefrom a first signal indicative of the desired range to said base point, means for deriving a second signal indicative of the actual range of said aircraft to the base point, comparison means for comparing said first and second signals and for generating therefrom a control signal dependent upon the range displacement of the aircraft from the desired range, and means responsive to said control signal for controlling the flight of said aircraft along a path where the aircraft's range and the desired range are one and the same.

3. Apparatus for automatically guiding an aircraft about a base point, comprising at the base point, transmitting means adapted to provide a directional azimuthally scanned radiant energy beam, means modulating said radiant energy beam with a pair of pulses the time spacing of which is indicative of a desired range to said base point, means varying the spacing of said pulses with variations in the bearing of said energy beam; at said aircraft, means for receiving said directional energy beam, means to determine the actual range of said aircraft to the base point, means to generate control signal dependent upon the range displacement of the aircraft from the desired range, and means responsive to the said control signal for controlling the flight of said aircraft along a path where the aircraft's range and the desired range are one and the same.

4. Apparatus for automatically guiding an aircraft about a base point, comprising at the base point, transmitting means adapted to provide a directional, azimuthally scanned radiant energy beam, means modulating said radiant energy beam with a pair of pulses the time spacing of which is indicative of a desired range to said base point, means varying the spacing of said pulses with variations in the bearing of said energy beam; at said aircraft, means for receiving said directional energy beam and for deriving therefrom a first signal indicative of the desired range to the base point, means for deriving a second signal indicative of the actual range of said aircraft to the base point, comparison means for comparing said first and second signals and for developing therefrom a control signal dependent upon the range displacement of the aircraft from the desired range, and means responsive to said control signal for controlling the flight of said aircraft along a path where the aircraft's range and the desired range are one and the same.

5. Apparatus for automatically guiding an aircraft about a base point, comprising at the base point, transmitting means adapted to provide a directional, azimuthally scanning radiant energy beam, first means modulating said radiant energy beam with first and second pulses the time spacing of which is indicative of a desired range to said base point, means varying the spacing of said pulses with variations in the bearing of said energy beam, beacon receiver means operative to produce a third pulse output from said transmitting means upon receipt of beacon pulses; at said aircraft, means for receiving said first and second pulses and for transmitting to said base point a beacon reply signal responsive to the first of said pulses thereby to inaugurate at said base point a third pulse the time spacing of which relative to the first of said pulses is indicative of the actual range of the aircraft to the base point, means to generate a control signal dependent upon the time difference in arrival at said aircraft of the second and third pulses, and means responsive to the aforesaid control signal for controlling the flight of said aircraft along a path where the aircraft's range and the desired range are one and the same.

6. In a system for establishing an aircraft flight control pattern about a base point, the combination; comprising, a base point transmitting means adapted to provide a directional, azimuthally scanning radiant energy beam, means modulating said beam to indicate a desired range to said base point, means operative to vary the modulation of said radiant energy beam with variations in bearing thereof, an aircraft receiver for receiving said energy beam and for indicating the desired range to said base point, and means for determining at said aircraft the actual range thereof to said base point whereby said aircraft may be maneuvered to assume a path where the aircraft's range and the desired range are identical.

7. In a system for establishing an aircraft flight control pattern about a base point, the combination; comprising, a base point transmitting means adapted to provide a directional, azimuthally scanning radiant energy beam, means modulating said beam with a pair of pulses the time spacing of which is indicative of a desired range to the base point, means varying the spacing of said pulses with variations in the bearing of said energy beam, an aircraft receiver for receiving said energy beam and for indicating the desired range to said base point, and means for determining at said aircraft the actual range thereof to said base point whereby said aircraft may be maneuvered to assume a path where the aircraft's range and the desired range are identical.

8. In a system for establishing an aircraft flight control pattern about a base point, the combination; comprising, a base point transmitting means adapted to provide a directional, azimuthally scanning radiant energy beam, first means modulating said radiant energy of beam with first and second pulses the time spacing of which is indicative of a desired range to said base point, means varying the spacing of said pulses with variations in the bearing of said energy beam, beacon receiver means operative to produce a third output pulse from said transmitting means upon receipt of beacon pulses, aircraft receiver means for receiving said first and second pulses and for transmitting to said base point a beacon reply signal responsive to said first pulse thereby to inaugurate a third pulse the time spacing of which relative to the first pulse is indicative of the aircraft's actual range, and means to indicate the actual and desired ranges at said aircraft whereby a path may be flown to cause the aircrafts actual and desired ranges to be one and the same.

9. Apparatus for automatically guiding an aircraft about a base point, comprising at the base point, transmitting means adapted to provide a directional radiant energy beam modulated to indicate a desired range to said base point, means to rotate said directional beam 360° about the base point and to synchronously vary the modulation with variataions in the bearing thereof to define an elliptical desired range track surrounding the base point; at said aircraft, means for receiving said directional energy beam, means to determine the actual range of said aircraft to the base point, means to generate a control signal dependent upon the range displacement of the aircraft from the desired range, and means responsive to said control signal for controlling the flight of said aircraft along a path where the aircraft's range and the desired range are one and the same.

10. An aircraft guidance system comprising, a first base point transmitting means adapted to provide a directional, azimuthally scanned energy beam, means modulating said energy beam to indicate a desired range to said base point, means operative to vary the modulation of said radiant energy beam with variations in bearing thereof, a second radiant energy transmitting means operative to project a highly directional energy beam upward from said base point in a substantially fixed direction; at said aircraft, means for receiving said azimuthally scanned energy beam and determining the aircrafts desired range therefrom, means operative to determine the actual range of said aircraft to said base point, means to generate a control signal dependent upon the range displacement of the aircraft from the desired range, control means responsive to said error signal to hold said aircraft in a flight path having the desired range to the base point, and a beam riding receiver means operative responsive to the receipt of a signal from said second transmitting means for directing the flight of said aircraft down the beam of said second transmitting means to the base point.

11. An aircraft guidance system comprising, a first base point transmitting means adapted to provide a directional, azimuthally scanned energy beam, means modulating said energy beam to indicate a desired range to said base point, means operative to vary the modulation of said radiant energy beam with variataions in bearing thereof, a second radiant energy transmitting means operative to project a highly directional energy beam upward from said base point in a substantially fixed direction; at said aircraft, means for receiving said azimuthally scanned energy beam and for deriving therefrom a first signal indicative of the desired range to said base point, means for deriving a second signal indicative of the actual range of said aircraft to the base point, signal comparison means for comparing said first and second signals and for generating an error signal therefrom in dependency upon the range displacement of the aircraft from the desired range, control means responsive to said error signal to hold said aircraft in a flight path having the desired range to the base point, and a beam riding receiver means operative responsive to the receipt of a signal from said second transmitting means for directing the flight of said aircraft down the beam of said second transmitting means to the base point.

12. An aircraft guidance system comprising, a first base point transmitting means adapted to provide a directional, azimuthally scanned energy beam, means modulating said energy beam to indicate a desired range to said base point, means operative to vary the modulation of said radiant energy beam with variations in bearing thereof, a second radiant energy transmitting means operative to project a highly directional energy beam upward from said base point in a substantially fixed direction; at said aircraft, means for receiving said azimuthally scanned energy beam and determining the aircraft's desired range therefrom, means operative to determine the actual range of said aircraft to said base point, whereby said aircraft may be controlled to follow a flight path having the desired range to the base point, and a beam riding receiver means operative responsive to the receipt of a signal from said second transmitting means for directing the flight of said aircraft down the beam of said second transmitting means to the base point.

13. An aircraft guidance system comprising, at a base point, first transmitting means adapted to provide a directional, azimuthally scanning radiant energy beam, first means modulating said radiant energy beam with first and second pulses the time spacing of which is indicative of a desired range to said base point, means varying the spacing of said pulses with variations in the bearing of said energy beam, beacon receiver means operative to produce a third pulse output from said transmiting means upon receipt of beacon pulses, a second radiant energy transmitting means operative to project a highly directional energy beam upward from said base point in a substantially fixed direction; at said aircraft, means for receiving said first and second pulses and for transmitting to said base point a beacon reply signal responsive to the first of said pulses thereby to inaugurate at said base point a third pulse the time spacing of which relative to the first of said pulses is indicative of the actual range of the aircraft to the base point, means to generate a control signal dependent upon the time difference in arrival at said aircraft of the second and third pulses, means responsive to the aforesaid control signal for controlling the flight of said aircraft along a path where the aircraft's range and the desired range are one and the same, and a beam riding receiver means operative responsive to the receipt of a signal from said second transmitting means for directing the flight of said aircraft down the beam of the second transmitting means to the base point.

14. An aircraft guidance system comprising, at a base point, first transmitting means adapted to provide a directional, azimuthally scanning radiant energy beam, first means modulating said radiant energy of beam with first and second pulses the time spacing of which is indicative of a desired range to said base point, means varying the spacing of said pulses with variations in the bearing of said energy beam, beacon receiver means operative to produce a third output pulse from said transmitting means upon receipt of beacon pulses, a second radiant energy transmitting means operative to project a highly directional energy beam upward from said base point in a substantially fixed direction; aircraft receiver means for receiving said first and second pulses and for transmitting to said base point a beacon reply signal responsive to said first pulse thereby to inaugurate a third pulse the time spacing of which relative to the first pulse is indicative of the aircraft's actual range, means to indicate the actual and desired ranges at said aircraft whereby a path may be flown to cause the aircraft's actual and desired ranges to be one and the same, and a beam riding receiver means operative responsive to the receipt of a signal from said second transmitting means for directing the flight of said aircraft down the beam of the second transmitting means to the base point.

References Cited by the Examiner
UNITED STATES PATENTS

| | | | |
|---|---|---|---|
| 2,429,595 | 10/1947 | Abraham | 343—107 |
| 2,560,289 | 7/1951 | Hasbrook | 343—7 |
| 2,576,963 | 12/1951 | Newsom | 343—13 |

CHESTER L. JUSTUS, *Primary Examiner.*

NORMAN H. EVANS, *Examiner.*

A. K. GEER, M. A. MORRISON, T. H. TUBBESING,
*Assistant Examiners.*